(12) United States Patent
Linzer

(10) Patent No.: US 9,423,999 B1
(45) Date of Patent: Aug. 23, 2016

(54) BLOCK FLOATING-POINT REPRESENTATION OF DATA SAMPLES

(75) Inventor: Elliot N. Linzer, Suffern, NY (US)

(73) Assignee: Ambarella, Inc., Santa Clara, CA (US)

( * ) Notice: Subject to any disclaimer, the term of this patent is extended or adjusted under 35 U.S.C. 154(b) by 2043 days.

(21) Appl. No.: 12/582,831

(22) Filed: Oct. 21, 2009

(51) Int. Cl.
*G06F 7/38* (2006.01)
*G06F 7/483* (2006.01)
*G06F 9/30* (2006.01)

(52) U.S. Cl.
CPC ............. *G06F 7/483* (2013.01); *G06F 9/3001* (2013.01)

(58) Field of Classification Search
CPC .. G06F 7/483; G06F 7/49905; G06F 9/3001; G06F 7/4876; G06F 9/3877
See application file for complete search history.

(56) References Cited

U.S. PATENT DOCUMENTS

| | | | |
|---|---|---|---|
| 5,675,610 A * | 10/1997 | Chinen | 375/260 |
| 8,396,119 B1 * | 3/2013 | Linzer | 375/240.03 |
| 8,401,863 B1 * | 3/2013 | Melkote et al. | 704/500 |
| 2004/0165667 A1 * | 8/2004 | Lennon et al. | 375/242 |
| 2004/0174378 A1 * | 9/2004 | Deering | 345/611 |
| 2007/0258641 A1 * | 11/2007 | Srinivasan et al. | 382/166 |
| 2008/0133246 A1 * | 6/2008 | Fellers et al. | 704/500 |
| 2009/0161796 A1 * | 6/2009 | Fisher-Jeffes | 375/317 |
| 2010/0220783 A1 * | 9/2010 | Mallat et al. | 375/240.03 |
| 2010/0305449 A1 * | 12/2010 | Wegener et al. | 600/459 |
| 2011/0052087 A1 * | 3/2011 | Mukherjee | 382/248 |
| 2011/0310974 A1 * | 12/2011 | Shand | 375/240.18 |

* cited by examiner

*Primary Examiner* — Henry Tsai
*Assistant Examiner* — Aurangzeb Hassan
(74) *Attorney, Agent, or Firm* — Christopher P. Maiorana, PC

(57) ABSTRACT

A method for representing a plurality of data samples is disclosed. The method generally includes steps (A) and (B). Step (A) may generate an exponent common to all of the data samples using a circuit. Step (B) may generate a plurality of mantissae based on the exponent. Each of the mantissae generally corresponds to a different one of the data samples.

23 Claims, 6 Drawing Sheets

BLOCK FLOATING-POINT REPRESENTATION OF DATA SAMPLES

CROSS REFERENCE TO RELATED APPLICATIONS

This application is related to co-pending U.S. application Ser. No. 12/570,104, filed Sep. 30, 2009, which is hereby incorporated by reference in its entirety.

FIELD OF THE INVENTION

The present invention relates to a method and/or architecture for floating-point data generally and, more particularly, to block floating-point representation of data samples.

BACKGROUND OF THE INVENTION

Fixed-point formats provide representations of numbers having several digits. Decimal (or radix) points of the numbers are fixed at a specific position among the digits. For example, a seven-digit number with the decimal point positioned after the fifth digit can represent numbers such as 12345.67, 8765.43 and 123.00.

Floating-point formats provide representations of numbers having a several digits and decimal points that can be placed anywhere relative to the significant digits of the number. An advantage of the floating-point representations over the fixed-point representations is that the floating-point representations can support a wider range of values. For example, the digit sequence 1234567 can represent multiple floating-point numbers such as 1.234567, 123456.7, 0.00001234567 and 1234567000000000. However, the floating-point formats use slightly more storage than the fixed-point formats to encode the position of the decimal (radix) point.

It would be desirable to have a representation format available for numbers commonly experienced in image processing that uses less storage space than the floating-point formats and is not constrained to the positioning of the decimal point, as in the fixed-point representations.

SUMMARY OF THE INVENTION

The present invention concerns a method for representing a plurality of data samples. The method generally includes steps (A) and (B). Step (A) may generate an exponent common to all of the data samples using a circuit. Step (B) may generate a plurality of mantissae based on the exponent. Each of the mantissae generally corresponds to a different one of the data samples.

The objects, features and advantages of the present invention include providing a method and apparatus for block floating-point representation of data samples that may (i) use less storage than common floating-point formats, (ii) allow for variable placement of the decimal (radix) point, (iii) reduce a size of digital pictures and/or (iv) support greater pixel data accuracy in shadow areas than in bright areas.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Floating-point representations are generally useful because the precision used for large numbers may be lower than the precision used for small numbers. For example, a mass of an object may be expressed to a nearest gram for an object of several kilograms. However, the mass may be express to a nearest milligram for an object of about one gram.

In some situations, a set (or group) of several numbers may exist where the intended precision is low if any of one or more of the numbers in the set are large. For example, a digital camera sensor generally measures an amount of light reaching the sensor at multiple pixels using a linear scale. The linear scale may use N (e.g., 14) bits. Thus, the amount of light received by each pixel may be represented as a value between 0 and $2^N-1$ (e.g., $2^{14}-1=16,383$).

The human visual system generally perceives much finer absolute changes in light where the changes occur in dark areas than in bright areas. Therefore, a finer precision may be used to represent the pixel data in the dark areas than in the bright areas. Use of the finer precision may not be based only on the brightness of a particular pixel, but also on the brightness of nearby pixels.

Embodiments of the present invention generally provide a compression scheme that may represent a group (or block) of numbers (or members). The representation may be referred to as a "block floating-point representation." Block floating-point representations generally use a single exponent for the group and each member of the group may have a separate integer mantissa (also known as a significand). As an example, consider the following base 10 numbers: 100.541, 200.21, 12.17777 and 5.3134. Representing the above numbers with four mantissae and a single exponent (e.g., −1) may result in the following: $1005\times10^{-1}$, $2002\times10^{-1}$, $121\times10^{-1}$ and $53\times10^{-1}$. The block floating-point representation method generally uses less storage than conventional floating-point representations because a single value is stored for the exponent instead of N values for N exponents corresponding to the N members of the set.

As another example, consider binary representations of numbers in a range [0, 16383]. A full precision representation may use 14 bits per number. Using the block floating-point representation, a block exponent may be represented with a few (e.g., 3) bits in a given range (e.g., [0, 7]). Additional bits (e.g., 7 bits) may be used to represent each of the mantissae in a range (e.g., [0, 127]). Therefore, a block having 3+7+7+7+7=31 bits may be used to represent all four numbers. Such a block generally has 7.75 bits/number. Generally, the four numbers of the block may be represented by $M1\times2^E$, $M2\times2^E$, $M3\times2^E$ and $M4\times2^E$ bits, where M1, M2, M3 and M4 may be the mantissae and E may be the exponent.

Figure 1:
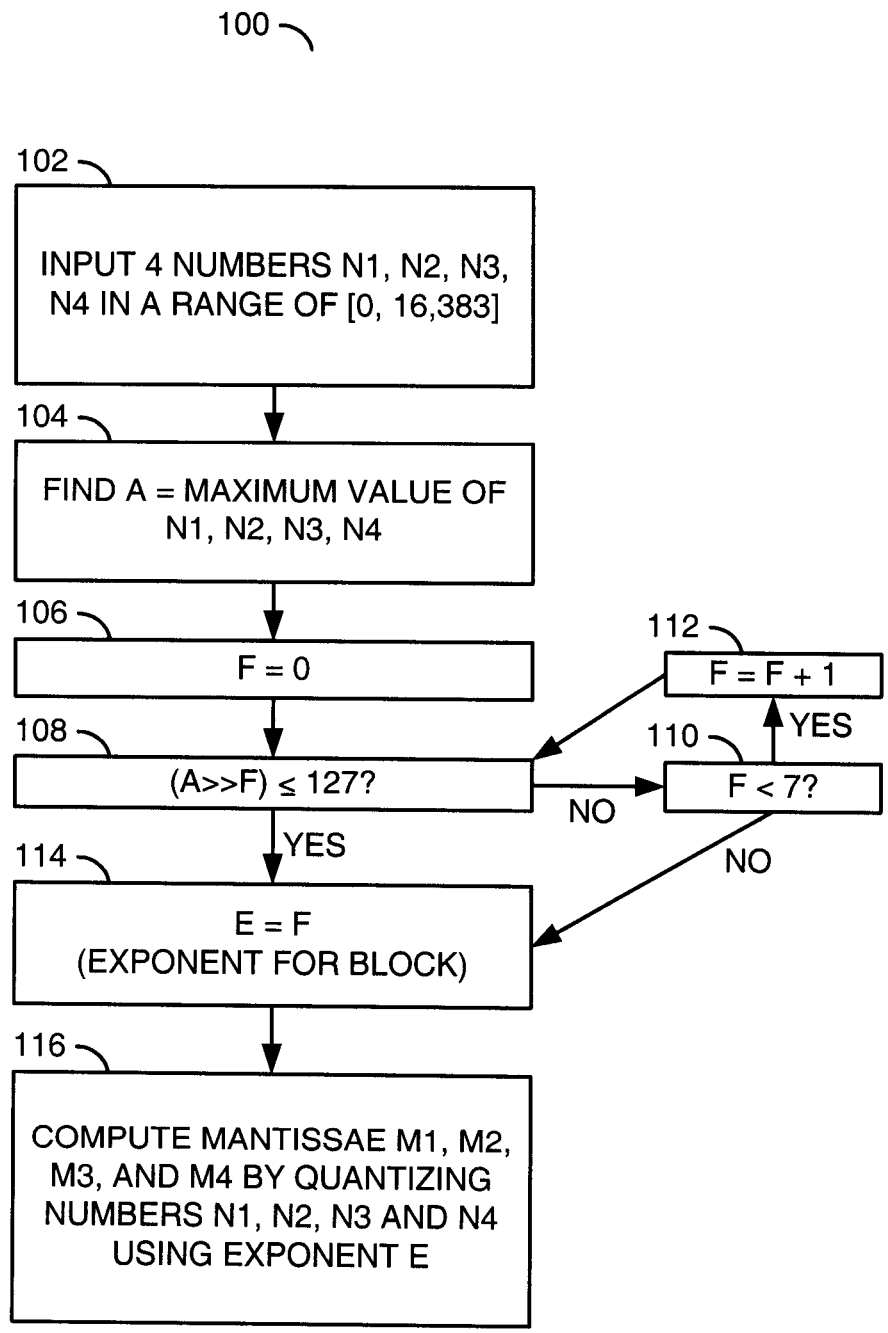
FIG. 1 is a flow diagram of an example implementation of a method in accordance with a preferred embodiment of the present invention.

Referring to FIG. 1, a flow diagram of an example implementation of a method 100 to convert a block of numbers into the block floating-point representation is shown in accordance with a preferred embodiment of the present invention. The method (or process) 100 generally comprises a step (or block) 102, a step (or block) 104, a step (or block) 106, a step (or block) 108, a step (or block) 110, a step (or block) 112, a step (or block) 114 and a step (or block) 116. The method 100 may be implemented by a circuit and/or a processor. The method may illustrate the conversion of four numbers. Conversion of other sized blocks may be implemented to meet the criteria of a particular application.

In step 102, the numbers (e.g., N1, N2, N3 and N4) may be received by the circuit. Each of the numbers N1 to N4 may be an integer having a range of values (e.g., [0, 16383]). The circuit may find a maximum number (e.g., A) in the set of numbers in step 104. In the step 106, an intermediate exponent (e.g., F) may be initialized to a default minimum value (e.g., set to zero).

The maximum number A may be right shifted by F bit positions (e.g., divide by $2^F$ and drop the fractional part) and compared with a mantissa threshold (e.g., $2^7-1=127$) in the step 108. If the right-shifted maximum number A is greater than the mantissa threshold (e.g., the NO branch of step 108), the current value of the intermediate exponent F may be checked in the step 110. If the intermediate exponent F is less than an exponent threshold (e.g., $2^3-1=7$) in the step 110 (the YES branch), the intermediate exponent F may be incremented in the step 112. After the step 112, the check of step 108 may be repeated with the larger intermediate exponent F (e.g., the maximum number A divided by a bigger power of two).

If the check in step 108 determines that the maximum number A right-shifted by F bits is not greater than the mantissa threshold (e.g., the YES branch of step 108), the method 100 may continue with step 114. If the check in step 110 determines that the current value of the intermediate exponent F is not less than the exponent threshold (e.g., the NO branch of step 110), the method 100 may continue with the step 114. In the step 114, a block exponent (e.g., E) may be set to the intermediate exponent F. The mantissae (e.g., M1, M2, M3 and M4) corresponding to the numbers N1 to N4 may be computed in step 116. The computation of step 116 generally involves quantizing the numbers N1 to N4 using the block exponent E.

By way of example, consider a set of numbers 8573, 9034, 8863 and 9111 entered in step 102. The maximum number A found in step 104 may be 9111. At step 106 the intermediate exponent F may be initialized to zero. In step 108, a value of $9111/2^0=9111$ is compared with the mantissa threshold value of 127. Since 9111 is greater than 127, the intermediate exponent F may be checked in step 110 and incremented to 1 in step 112. In the second pass through step 108, the value $9111/2^1=4555$ (after dropping the fractional part) is still greater than 127. The loop around steps 108, 110 and 112 may continue until $9111/2^7=71$ (after dropping the fractional part)$\leq127$ and thus E=7 per step 114. Each of the numbers 8573, 9034, 8863 and 9111 may be quantized in step 116 to respective values of 66, 70, 69 and 71. Reconstruction based on the values 66, 70, 69 and 71 may produce respective values of $(66\times128)+64=8512$, $(70\times128)+64=9024$, $(69\times128)+64=8896$ and $(71\times128)+64=9152$.

Figure 2:
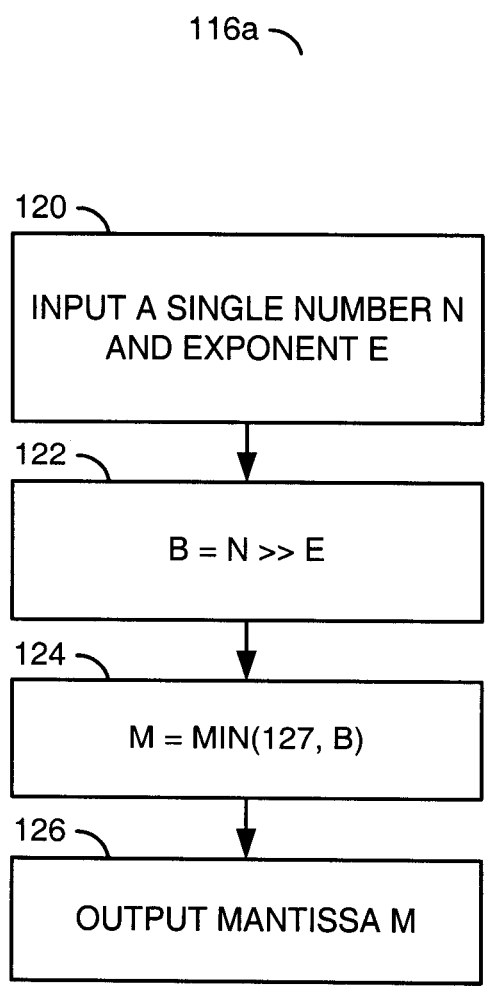
FIG. 2 is a flow diagram of a first example implementation of a quantization step in the method of FIG. 1.

Referring to FIG. 2, a flow diagram of a first example implementation of the quantization step 116 is shown. The first example implementation may be referred to as a step 116a. The step 116a generally comprises a step (or block) 120, a step (or block) 122, a step (or block) 124 and a step (or block) 126. The step 116a may be implemented by the circuit and/or processor performing the method 100.

In the step 120, a given number (e.g., N) among the numbers N1 to N4 and the block exponent E may be entered into the circuit/processor. An intermediate mantissa (e.g., B) may be calculated in the step 122. The calculation generally involves right-shifting (e.g., dividing by a power of two) the number N by E positions (e.g., dividing by $2^E$ and dropping the fractional part). In the step 124, a quantized mantissa (e.g., M) may be determined as a minimum of either (i) the mantissa threshold or (ii) the intermediate mantissa B. The quantized mantissa M corresponding to the given number N may be presented from the method in the step 126. The above steps may be repeated for each of the numbers N1 to N4 in the block to generate the corresponding mantissae M1 to M4, respectively.

Reconstructing the numbers N1 to N4 from the block floating-point representation generally involves using one of multiple (e.g., 2) equations that may be selected based on the block exponent E. If E=0, a reconstructed number (e.g., R) may be calculated as $R=2^0\times M=M$. If E>0, the reconstructed number $R=(2^E\times M)+2^{E-1}$. The calculation may be repeated for each of the mantissae M1 to M4 in the block to generate reconstructed numbers R1 to R4. A range of the reconstructed numbers M1 to M4 in the example may be [0, 16320].

Figure 3:
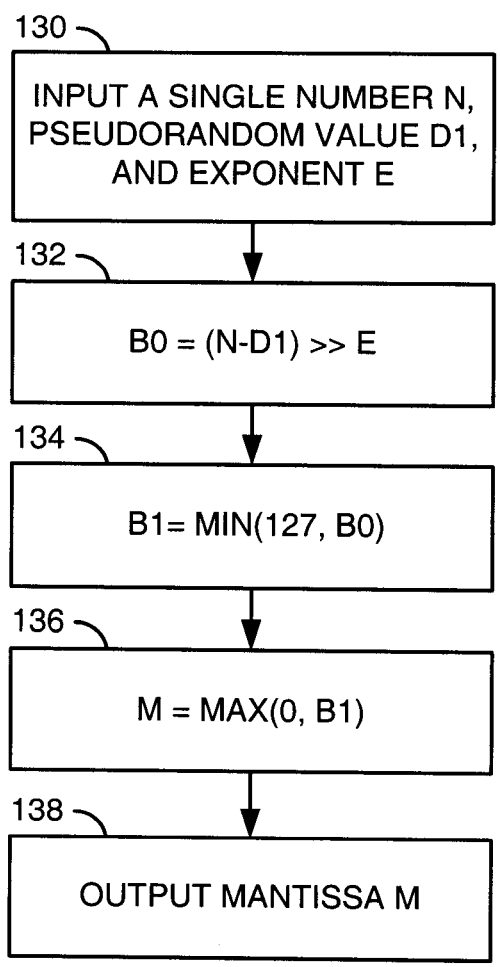
FIG. 3 is a flow diagram of a second example implementation of the quantization step.

Referring to FIG. 3, a flow diagram of a second example implementation of the quantization step 116 is shown. The second example implementation may be referred to as a step 116b. The step 116b generally comprises a step (or block) 130, a step (or block) 132, a step (or block) 134, a step (or block) 136 and a step (or block) 138. The step 116b may be implemented by the circuit and/or processor performing the method 100. The step 116b generally includes a pseudorandom process to calculate one or more pseudorandom numbers (e.g., D1).

The pseudorandom process is generally used to randomize quantization bins used in both a quantization process and a dequantization (inverse quantization) process. The randomization of the quantization bins may prevent sequences of slowly-varying data sample values from creating distinct contours in recovered sample values at the end of the dequantization process. Randomization of the quantization bins may be synchronized between a compression process and a decompression process such that for each given sample, both processes utilize a same randomized quantization bin to operate on the given samples. The pseudorandom process generally establishes one or more sequences of pseudorandom values. Pairing of the data samples with the corresponding pseudorandom values may be based on one or more of temporal positions of the data samples, spatial positions of the data samples and/or frequency positions of the data samples (e.g., data samples are transform coefficients).

Randomization of the quantization bins during compression may be achieved by adjusting the original data samples with corresponding pseudorandom values prior to quantization. For example, a quantized sample (e.g., Q) may be calculated as $Q=\text{floor}((X-D1(K))/S)$, where X may be an original data sample, K may represent a temporal position, a spatial position and/or a frequency position of the sample X, D1(K) may be a pseudorandom value based on K, and S may represent a quantization step size. The function "floor (A/B)" may choose the largest integer that is not smaller than A/B (e.g., drop the fractional part). The randomization process effectively offsets the positions of the randomized quantization bins from the positions of the non-randomized quantization bin. When applied to the block floating-point representation, the quantized sample Q may be used as a quantized mantissa M. Other adjustments may be implemented to meet the criteria of a particular application.

Randomization of the quantization bins during decompression may be achieved by adjusting decompressed samples with the corresponding pseudorandom values as part of the dequantization. For example, a recovered sample (e.g., T) may be calculated as T=(S×Q)+C+D2(K), where C may be a constant offset and D2(K) may be a pseudorandom value based on K. In some embodiments, the pseudorandom values D1(K)=D2(K) for all values of K. In other embodiments, the pseudorandom values D1(K)≠D2(K). Where applied to the block floating-point representation, the recovered sample T may be used as the reconstructed number R. Other adjustments may be implemented to meet the criteria of a particular application. Additional details regarding the pseudorandom process may be found in co-pending U.S. application Ser. No. 12/570,104.

In the step 130, a given number (e.g., N) among the numbers N1 to N4, the pseudorandom number D1 and the block exponent E may be entered into the circuit/processor. In some embodiments, a different pseudorandom number D1 may be computed for each number N that is being quantized. The pseudorandom number D1 may be (i) zero (not random) if E=0 and (ii) generated in a range $[-2^{E-1}, 2^{E-1}+1]$ otherwise. Table I below generally shows the range of the pseudorandom number D1 for all values of E in the example:

TABLE I

| E | MINIMUM VALUE OF D1 | MAXIMUM VALUE OF D1 |
|---|---|---|
| 0 | 0 | 0 |
| 1 | −1 | 0 |
| 2 | −2 | 1 |
| 3 | −4 | 3 |
| 4 | −8 | 7 |
| 5 | −16 | 15 |
| 6 | −32 | 31 |
| 7 | −64 | 63 |

A first intermediate mantissa (e.g., B0) may be calculated in the step 132. The calculation generally involves (i) subtracting the pseudorandom number D1 from the number N and (ii) right-shifting (e.g., dividing by a power of two) the difference (N−D1) by E positions (e.g., dividing by $2^E$ and dropping the fractional part). In the step 134, a second intermediate mantissa (e.g., B1) may be determined as a minimum of either (i) the mantissa threshold or (ii) the first intermediate mantissa B0. Due to the pseudorandom number D1, the second intermediate mantissa B1 may have a negative value. Therefore, in step 136, the quantized mantissa M may be determined as a maximum of either (i) zero or (ii) the second intermediate mantissa B1. The quantized mantissa M corresponding to the given number N may be presented from the method in the step 138. The above steps may be repeated for each of the numbers N1 to N4 in the block to generate the corresponding mantissae M1 to M4, respectively. In some embodiments, the same pseudorandom number D1 may be used to calculate all of the mantissae M1 to M4 and recovered numbers R1 to R4. In other embodiments, different pseudorandom numbers (e.g., D1(K)) may be used to calculate each corresponding pair of the mantissa M and the reconstructed number R.

Reconstructing the numbers N1 to N4 from the block floating-point representation with pseudorandom quantization generally involves using one of multiple (e.g., 2) equations that may be selected based on the block exponent E. If E=0, the reconstructed number R may be calculated as R=$2^0$×M=M. If E>0, the reconstructed number R=($2^E$×M)+$2^{E-1}$+D2, where D2 may be the same pseudorandom number D1 used to quantize the number N (e.g., D2=D1). The calculation may be repeated for each of the mantissae M1 to M4 in the block to generate reconstructed numbers R1 to R4.

The examples described above generally use four numbers in a given block. Other sizes of blocks may be implemented to meet the criteria of a particular application. For example, a block may contain two numbers and thus have an average of (3+7+7)/2=8.5 bits/number. In another example, a block may contain 16 numbers and thus have an average of (3+(16×7))/16=7.1875 bits/number.

The examples described above generally use 7 bits to represent each mantissa M. Other sizes of mantissa M may be implemented to meet the criteria of a particular application. For example, each mantissa M may be represented by 8 bits. Returning to the four numbers per block examples, the block may average 8.75 bits/number and would more accurately represent the numbers compared with the 7-bits mantissa embodiments. For 8-bit mantissa embodiments, the block exponent E may have a largest value of 6 to enable the representation to span the full range of the 14-bit input numbers N (e.g., $2^8$ mantissa×$2^6$ exponent to reach up to a maximum value of 16,383). Therefore, even though the block exponent E may be implemented as a 3-bit number (that generally gives the block exponent E an available range of values from 0 to 7), only block exponents E in a range of 0 to 6 are generally used.

Some embodiments may use only 6 bits in each mantissa M. Therefore, the block exponent E may have values in a range of 0 to 8 to represent the 14-bit input numbers N. In some embodiments, the block exponent E may be represented with a 4-bit value. In other embodiments, the 3-bit block exponent E may be considered to have a range of 1 to 8, instead of 0 to 7. Storing the block exponent E using 4 bits may produce (4+6+6+6+6)/4=7 bits/number. Considering the smallest block exponent E to be 1 may produce (3+6+6+6+6)/4=6.75 bits/number.

In the above examples, the input numbers N were generally treated as 14-bit numbers. Other sizes of the input numbers N may be implemented to meet the criteria of a particular application. For example, the input numbers N may be 8-bit numbers, 16-bit numbers, 32-bit numbers or the like.

Figure 4:
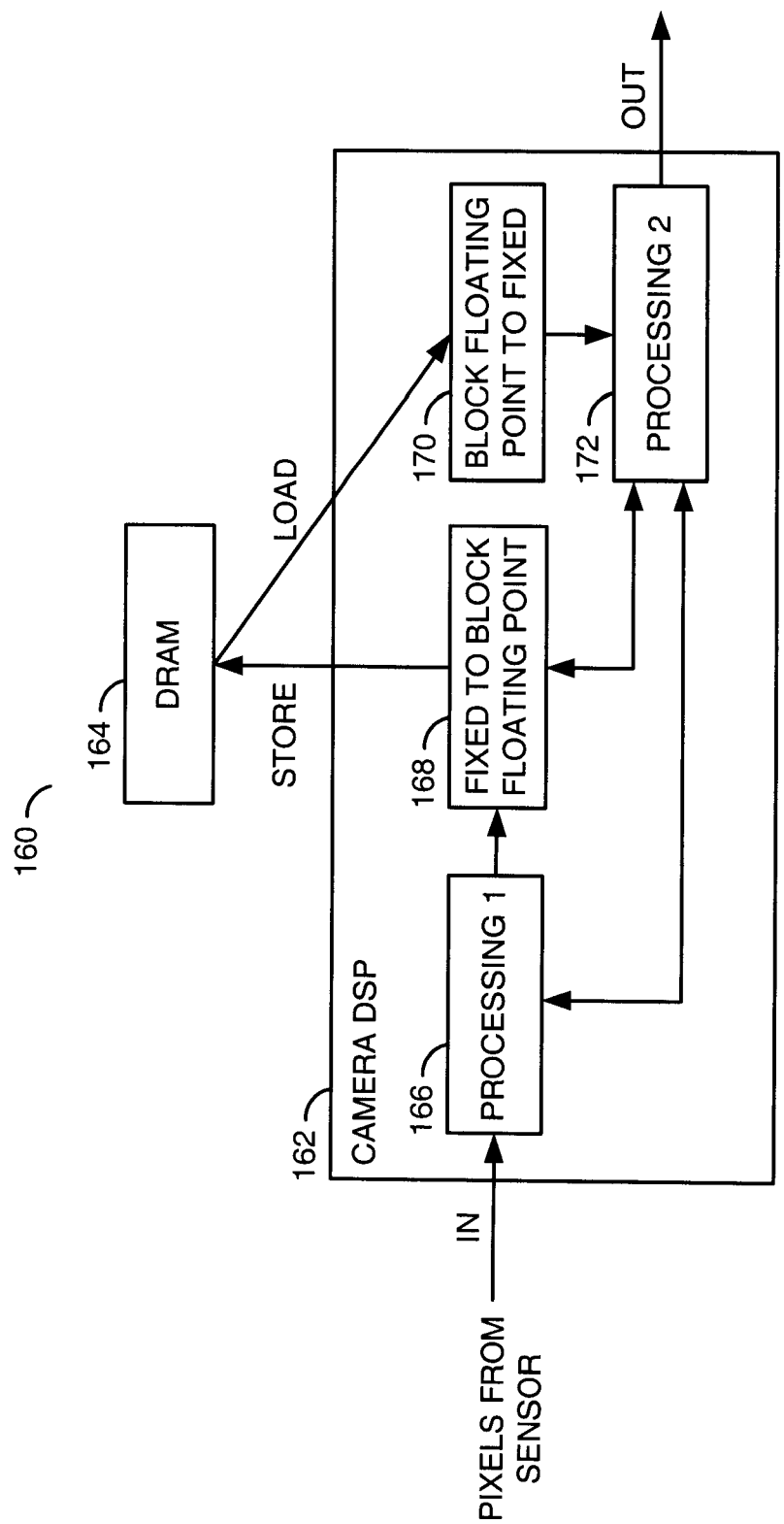
FIG. 4 is a block diagram of an example implementation of a portion of a first apparatus.

Referring to FIG. 4, a block diagram of an example implementation of a portion of a first apparatus 160 is shown. The apparatus (or system) 160 may be part of a digital video camera or a digital still camera. The apparatus 160 generally comprises a circuit (or module) 162 and a circuit (or module) 164. A signal (e.g., IN) may be received by the circuit 162 at an input port. A signal (e.g., OUT) may be generated and presented by the circuit 162 at an output port. The circuit 162 may generate and present a signal (e.g., STORE) to the circuit 164. A signal (e.g., LOAD) may be generated by the circuit 164 and presented to the circuit 162. The apparatus 160 may be designed to implement the method 100.

The circuit 162 may be implemented as a digital signal processor (DSP) circuit. The circuit 162 is generally operational to process pixel data received in the signal IN to create compressed images in the signal OUT. The circuit 162 may be fabricated in (on) a first die or first chip.

The circuit 164 may be implemented as an external memory circuit. In some embodiments, the circuit 164 may be designed as a dynamic random access memory (DRAM). Other types of memory may be implemented to meet the criteria of a particular application. The circuit 164 is generally operational to buffer data presented in the signal STORE. The circuit 164 may also be operational to send data to the circuit 162 in the signal LOAD. The circuit 164 may be fabricated in (on) a second die or second chip that is different from the first die.

The circuit 162 generally comprises a circuit (or module) 166, a circuit (or module) 168, a circuit (or module) 170 and a circuit (or module) 172. The circuit 166 may receive the signal IN. The signal STORE may be generated by the circuit 168. The circuit 170 may receive the signal LOAD. The signal OUT may be generated by the circuit 172. The circuit 166 is generally in communication with the circuit 168. The circuit 170 may be in communication with the circuit 172. In some embodiments, the circuits 168 and 172 may be in communication with each other. In some embodiments, the circuits 166 and 172 may communicate with each other. The circuits 166 to 172 may be implemented in hardware, software, firmware or any combination thereof.

Intermediate pixel data in digital cameras typically use higher precision than the final pixels (typically 8-bit values) computed by the digital camera. Block floating-point representation may be used for the high precision intermediate pixels in a number of places.

The circuit 166 generally implements a first processing circuit. Processing performed by the circuit 166 may include, but is not limited to, some noise removal (e.g., bad pixel correction) and/or filtering. In some embodiments, the circuit 166 may implement a null operation.

The circuit 168 may implement a compression circuit. The circuit 168 is generally operational to compress the pixel data received from the circuit 166 into the block floating-point representation. The compression may be performed according to the method 100. The circuit 166 may write the resulting block floating-point representations into the circuit 164 via the signal STORE.

The circuit 170 may implement a decompression circuit. The circuit 170 is generally operational to decompress the block floating-point representations received from the circuit 164 via the signal LOAD. The decompressed pixel data may be presented in either fixed-point representation, floating-point representation, integer representation or other appropriate representation.

The circuit 172 may implement a processing circuit. The circuit 172 is generally operation to perform other camera functions such as white balance, demosaic and color correction. If partially processed data is to undergo additional processing by the circuit 172 at a later time, the partially processed data may be sent back to the circuit 168 for compression and temporary storage in the circuit 164. Fully processed data may be presented by the circuit 172 in the signal OUT. The signal OUT may comprise a still image (e.g., JPEG) and/or a video bitstream (e.g., ITU-R BT.656-4).

Several reasons may exist in a given embodiment to store information in the circuit 164. In a first case, circuit 172 may process neighborhoods of pixels. For example, a demosaic process may utilize pixels in a small neighborhood around the current pixel being considered. The neighbor pixels may be stored into the circuit 164 when available from the circuit 166 and loaded back to the circuit 172 for subsequent processing. Typically, temporary storage of the neighborhood pixels may be done with line buffers. For example, if the demosaic process operates on a 7×7 region, 6 line buffers may be used in the circuit 162 so that the pixels around the current pixel being processed may be efficiently accessed. If a horizontal size of the line buffer is narrower than the picture being processed, the picture may be processed in vertical stripes (striping). However, because the pixel data does not arrive from the sensor in stripes, the pixel data may be initially stored to circuit 164 and later loaded back to the circuit 162 in stripes.

In a second case, the circuit 172 may perform multiple passes through each picture. Therefore, each picture may be initially stored into the circuit 164. Copies of the picture may subsequently be loaded back to the circuit 162 multiple times.

In a third case, the signal IN may carry video data. High resolution versions of one or more pictures may be parsed form the signal IN by the circuit 166, compressed by the circuit 168 and stored to the circuit 164 while the circuit 172 is performing video processing. During inter-frame/field gaps in the video and/or after the video recording has been stopped, the high resolution pictures may be loaded back to the circuit 162, decompressed by the circuit 170 and processed as a still picture by the circuit 172.

Figure 5:
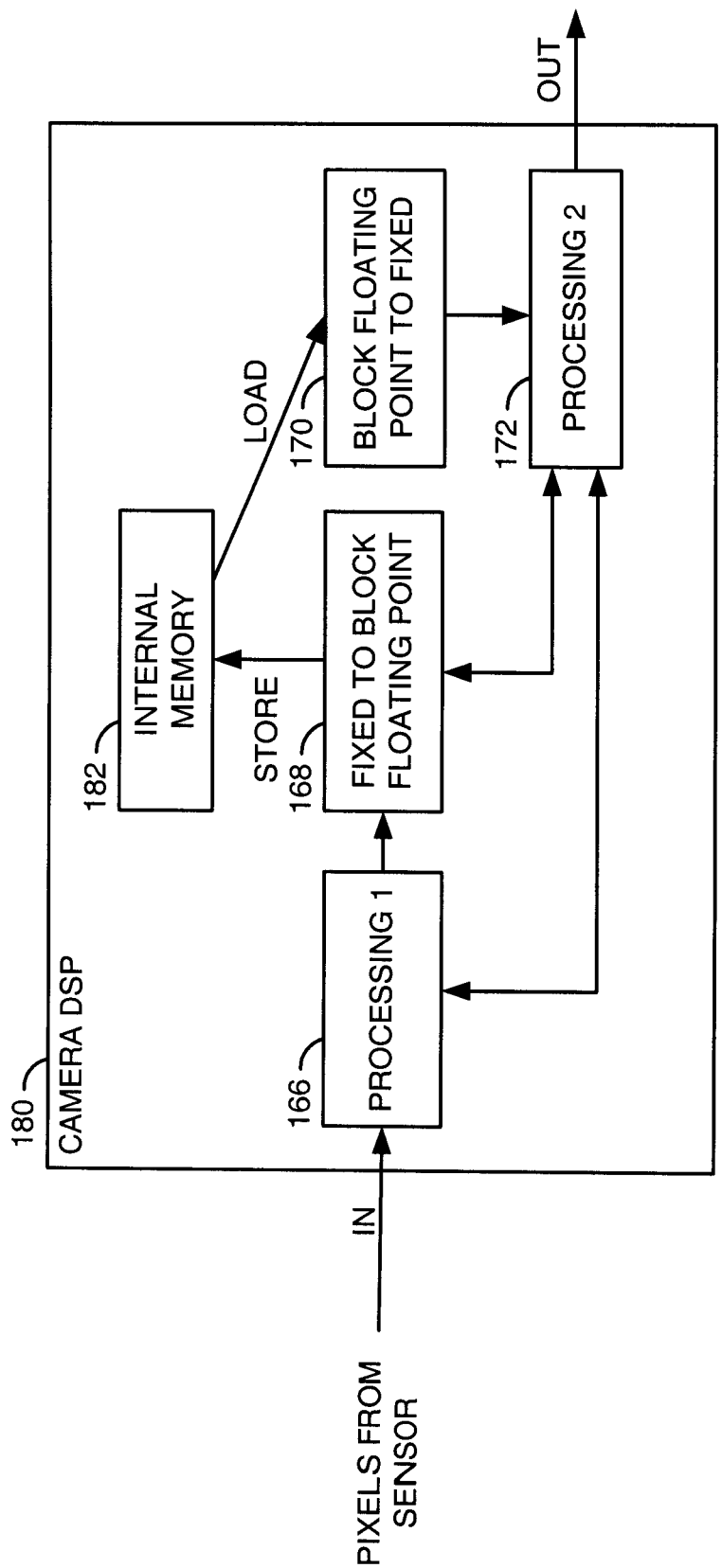
FIG. 5 is a block diagram of an example implementation of a portion of a second apparatus.

Referring to FIG. 5, a block diagram of an example implementation of a portion of a second apparatus 180 is shown. The apparatus (or system) 180 may implement a digital video camera and/or a digital still camera. The apparatus 180 generally comprises the circuit 166, the circuit 168, the circuit 170, the circuit 172 and a circuit (or module) 182. The circuit 182 may receive the signal STORE from the circuit 168. The signal LOAD may be generated by the circuit 182 and presented to the circuit 170. The circuit 182 may be implemented in hardware, firmware or any combination thereof. The apparatus 180 may be designed to implement the method 100.

The circuit 182 may be implemented as a line buffer circuit. The circuit 182 is generally operational to store data for the circuit 180 temporarily. Fabrication of the circuit 182 is generally in (on) the same die or chip as the other circuits 166 to 172. The circuit 182 may be used in similar fashions as the circuit 164. Data may be temporarily stored in the circuit 182 before, during and/or after processing by the circuit 166 and the circuit 172.

Figure 6:
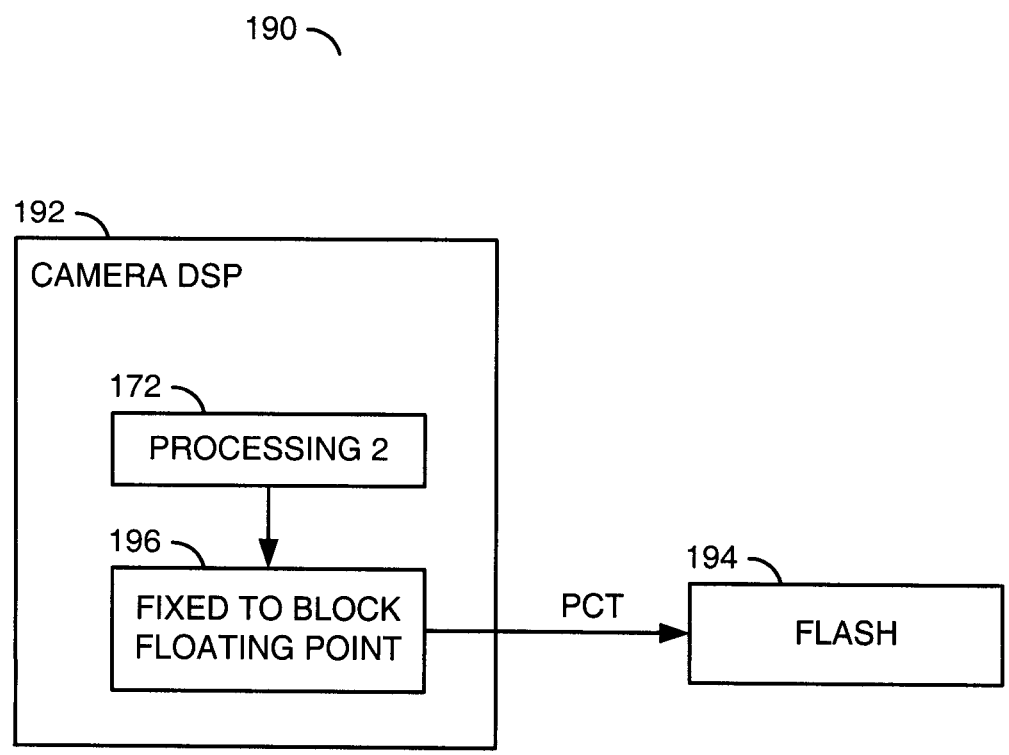
FIG. 6 is a block diagram of an example implementation of a portion of a third apparatus.

Referring to FIG. 6, a block diagram of an example implementation of a portion of a third apparatus 190 is shown. The apparatus (or system) 190 may implement a digital video camera and/or a digital still camera. The apparatus 190 generally comprises a circuit (or module) 192 and a circuit (or module) 194. A signal (e.g., PCT) may be generated by the circuit 192 and presented to the circuit 194. The circuits 192 and 194 may be implemented in hardware, software, firmware or any combination thereof. The apparatus 190 may be designed to implement the method 100.

The circuit 192 generally implements a digital signal processing circuit. The circuit 192 may be operational to process still and/or video pictures. The circuit 192 generally comprises the circuit 172 and a circuit (or module) 196. The circuit 196 may implement a compression circuit, similar to the circuit 168. The circuit 196 may be operational to compress the image data received from the circuit 172 into the block floating-point representation. The compression may be performed according to the method 100. The compressed information may be transferred from the circuit 196 to the circuit 194 via the signal PCT.

The circuit 194 may implement a memory circuit. In some embodiments, the circuit 194 may implement a FLASH memory. The circuit 194 is generally operational to store the still and/or video data received via the signal PCT.

Some digital cameras may store unprocessed or minimally processed versions of the pictures in raw image files. Raw image files may include, but are not limited to, the ".raw" format, the the ".tif" format, the ".arw" format and the ".fff" format. By including the circuit 196 in a design of a digital camera, the raw image data may be compressed using the block floating-point representation before storage in the circuit 194. Therefore, more pictures may be stored in the circuit 194 than if the pictures were in a raw format.

The functions performed by the diagrams of FIGS. 1-6 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the spirit and scope of the invention.

The invention claimed is:

1. A method for representing a plurality of data samples, comprising the steps of:
   (A) calculating a maximum value of said data samples in a camera;
   (B) generating an exponent common to all of said data samples based on said maximum value and a threshold value in an iterative sequence;
   (C) generating a plurality of mantissae by quantizing said data samples based on a plurality of randomized quantization bins and said exponent, wherein each of said mantissae corresponds to a different one of said data samples;
   (D) buffering a block containing said mantissae and said exponent in a memory;
   (E) converting said block as buffered in said memory into a fixed-point representation; and
   (F) processing said data samples as a picture after conversion to said fixed-point representation.

2. The method according to claim 1, wherein said block forms a block floating-point representation of said data samples.

3. The method according to claim 1, wherein generation of said mantissae includes generating a size signal having a quantization step size corresponding to said data samples.

4. The method according to claim 1, wherein said iterative sequence generates an intermediate value by dividing said maximum value by increasing powers of two until said intermediate value is less than said threshold value.

5. The method according to claim 1, wherein said iterative sequence generates an intermediate value by dividing said maximum value by increasing powers of two until said power of two exceeds said threshold value.

6. The method according to claim 1, wherein the steps are performed by processor executable instructions contained within a non-transitory computer readable medium.

7. An apparatus comprising:
   an interface configured to receive a plurality of data samples in a camera; and
   a circuit configured to (i) calculate a maximum value of said data samples, (ii) generate an exponent common to all of said data samples based on said maximum value and a threshold value in an iterative sequence, (iii) generate a plurality of mantissae by quantizing said data samples based on a plurality of randomized quantization bins and said exponent, (iv) buffer a block containing said mantissae and said exponent in a memory, (v) convert said block as buffered in said memory into a fixed-point representation and (vi) process said data samples as a picture after conversion to said fixed-point representation, wherein each of said mantissae corresponds to a different one of said data samples.

8. The apparatus according to claim 7, wherein said block forms a block floating-point representation of said data samples.

9. The apparatus according to claim 7, wherein said data samples comprise pixel data.

10. The apparatus according to claim 7, wherein said circuit is further configure to capture video containing said data samples.

11. The apparatus according to claim 7, wherein said block is stored in said memory within a raw image file.

12. The apparatus according to claim 8, wherein said circuit is further configured to generate a plurality of processed samples by performing said process on said data samples after conversion to said fixed-point representation.

13. The apparatus according to claim 7, wherein said process includes at least one of (i) a white balance process, (ii) a demosaic process, (iii) a color correction process, (iv) digital gain process and (v) a digital offset process.

14. The apparatus according to claim 12, wherein said circuit is further configured to (i) compress said processed samples into said block floating-point representation and (ii) store said compressed processed samples in said memory.

15. The apparatus according to claim 7, wherein said memory forms part of said circuit.

16. The apparatus according to claim 7, wherein said memory is external to said circuit.

17. The apparatus according to claim 7, wherein said mantissae are represented with at most 7 bits and said exponent is represented with at most 3 bits.

18. An apparatus comprising:
means for calculating a maximum value of a plurality of data samples in a camera
means for generating an exponent common to all of said data samples based on said maximum value and a threshold value in an iterative sequence;
means for generating a plurality of mantissae by quantizing said data samples based on a plurality of randomized quantization bins and said exponent, wherein each of said mantissae corresponds to a different one of said data samples;
means for buffering a block containing said mantissae and said exponent in a memory;
means for converting said block as buffered in said memory into a fixed-point representation; and
means for processing said data samples as a picture after conversion to said fixed-point representation.

19. The method according to claim 1, wherein said plurality of data samples comprise at least four data samples.

20. The method according to claim 1, further comprising the step of:
generating said randomized quantization bins based on a pseudorandom process.

21. The apparatus according to claim 7, wherein said iterative sequence generates an intermediate value by dividing said maximum value by increasing powers of two until said intermediate value is less than said threshold value.

22. The apparatus according to claim 7, wherein said iterative sequence generates an intermediate value by dividing said maximum value by increasing powers of two until said power of two exceeds said threshold value.

23. The method according to claim 1, wherein said data samples comprise pixel data.

* * * * *